(12) United States Patent
Chen et al.

(10) Patent No.: US 7,182,499 B2
(45) Date of Patent: Feb. 27, 2007

(54) LIGHT-CONDUCTIVE BOARD AND A REAR LIGHT MODULE USING THE LIGHT-CONDUCTIVE BOARD

(75) Inventors: Yung-Jen Chen, Feng Shan (TW); Pei-Fen Hou, Feng Shan (TW); Kuan-Ling Tseng, Feng Shan (TW); Yen-Chuan Chu, Kaohsiung (TW); Ying-Fu Wang, Taipei (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 160 days.

(21) Appl. No.: 10/986,370

(22) Filed: Nov. 12, 2004

(65) Prior Publication Data

US 2006/0104091 A1    May 18, 2006

(51) Int. Cl.
*F21V 7/04*   (2006.01)
*F21V 8/00*   (2006.01)

(52) U.S. Cl. ............... 362/621; 362/607; 362/608; 362/612; 362/625; 362/628

(58) Field of Classification Search ........... 362/621, 362/607, 608, 609, 610, 612, 613, 628, 27, 362/625
See application file for complete search history.

(56) References Cited

U.S. PATENT DOCUMENTS

| 4,282,560 | A  | * | 8/1981  | Kringel et al. ............ 362/628 |
| 4,929,062 | A  | * | 5/1990  | Guzik et al. .............. 362/612 |
| 5,414,598 | A  | * | 5/1995  | Anderson ................. 362/628 |
| 5,590,945 | A  | * | 1/1997  | Simms ...................... 362/27 |
| 6,474,827 | B2 | * | 11/2002 | Shinohara et al. ........ 362/607 |
| 6,568,821 | B1 | * | 5/2003  | Page et al. ............... 362/609 |
| 6,669,350 | B2 | * | 12/2003 | Yamashita et al. ........ 362/612 |
| 6,971,758 | B2 | * | 12/2005 | Inui et al. ................ 362/602 |
| 7,139,048 | B2 | * | 11/2006 | Han et al. ................ 362/621 |

* cited by examiner

*Primary Examiner*—Alan Cariaso
(74) *Attorney, Agent, or Firm*—Leong C. Lei

(57) ABSTRACT

A light-conductive board and a rear light module using the light-conductive board is disclosed. The light-conductive plate having a light-emitting face, a light-reflecting face, and at least a light-entering face and the light-reflecting plate adhered onto the external of the light-reflecting face of the light-conductive board, an optical film including a divergent lens and a convergent lens mounted onto the external of light-emitting face of the light-conductive board, a lamp reflector which encloses a lamp source, and the light-entering face of the light-conductive board corresponding to the circumferential edge of the light-entering recessed region of the lamp source adjacent to the light-emitting face or one of the face of the reflection face at least forms into a protruded section.

1 Claim, 10 Drawing Sheets

LIGHT-CONDUCTIVE BOARD AND A REAR LIGHT MODULE USING THE LIGHT-CONDUCTIVE BOARD

BACKGROUND OF THE INVENTION (a) Technical Field of the Invention

The present invention relates to a light-conductive board and a rear light module, and in particular to a light-conductive board having a light-entering recess section circumferential edge mounted with a protruded section, facilitating the application of rear light module to output even and high hue light source so as to improve the light output efficiency of the entire module.

(b) Description of the Prior Art

The majority of LCDs consists of a displaying panel and a rear light module. The rear light module is an essential element being a light source. Thus, it is an important element within the LCD.

FIG. 1 shows a conventional rear light module 1 including a conductive light board 11, an optical film 12 and a LED light source 13. FIG. 2 shows the application of the rear light module 1. The light source of LED lamp source 13 is affected by the reflector 131 and the light source will enter the light-entering face 11. By means of the light-conductive point 113 and the reflecting board 14, the light source is reflected as light.

Due to the fact that the light-entering face 114 of the light-conductive board 11 is a mirror-like structure, when the light source of the LED lamp source 13 enters the light-conductive board 11, the light reflection angle is rather small, about 120 degree. Thus a grey area 15 is obtained and the hue of the module 1 is not even.

FIG. 3 shows another rear light module 2 including a light conductive board 21, an optical film 22 and LED lamp source 23. The saw-like sloping face of the light entering section 2141 provides a better refraction so that the light source generates a dispersion effect and the angle of the light source of LED 23 entering the light-conductive board 21 is wider and the refraction is greater than 120 degree. Thus, the grey region 25 obtains more light sourse.

FIG. 4 shows another conventional light conductive board 21 of the rear light module 2. The refraction angle is limited and the problem of grey region 25 has not been overcome.

FIG. 5 shows another rear light module 3 including a light-conductive board 31, an optical film 32 and a LED lamp source 33. The light entering face of the ligln-conductive board 31 is a light recessed section 3141. When application, as shown in FIG 6, the light source will enter the light-entering face 314 of the light conductive board 31. The light-entering recessed section 3141 of the light entering face 314 refracts the light source and this will reduce significantly the grey region 35. This method cannot fully improve the formation of the grey region 35. Thus, it is an object of the present invention to solve the above drawbacks.

SUMMARY OF THE INVENTION

Accordingly, it is an object of the present invention to provide a light-conductive board and a rear light module using the light-conductive light-reflection face and at least a light-entering face characterized in that the circumferential edge of the recessed section of the light-entering face forms a protruded region with at least one adjacent light-emitting face or one face of the light-reflecting face region.

Yet another object of the present invention is to provide a light-conductive board and a rear-light module using the light-conductive board, the rear-light module includes a light-conductive plate having a light-emitting face, a light-reflecting face, and at least a light-entering face and the light-reflecting plate adhered onto the external of the light-reflecting face of the light-conductive board, an optical film including a divergent lens and a convergent lens mounted onto the external of light-emitting face of the light-conductive board, a lamp reflector which encloses a lamp source, and the light-entering face of the light-conductive board corresponding to the circumferential edge of the light-entering recessed region of the lamp source adjacent to the light-emitting face or one of the face of the reflection face at least forms into a protruded section.

Still another object of the present invention is to provide a light-conductive board and a rear light module using the light-conductive board, wherein the light-emitting face adjacent to the light-entering recessed board can extend the incident light angle of the lamp source to eliminate the grey area due to excessive small lamp source.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention illustration for implementing exemplary embodiments of the invention. Various changes to the described embodiments may be made in the function and arrangement of the elements described without departing from the scope of the invention as set forth in the appended claims.

Figure 1:
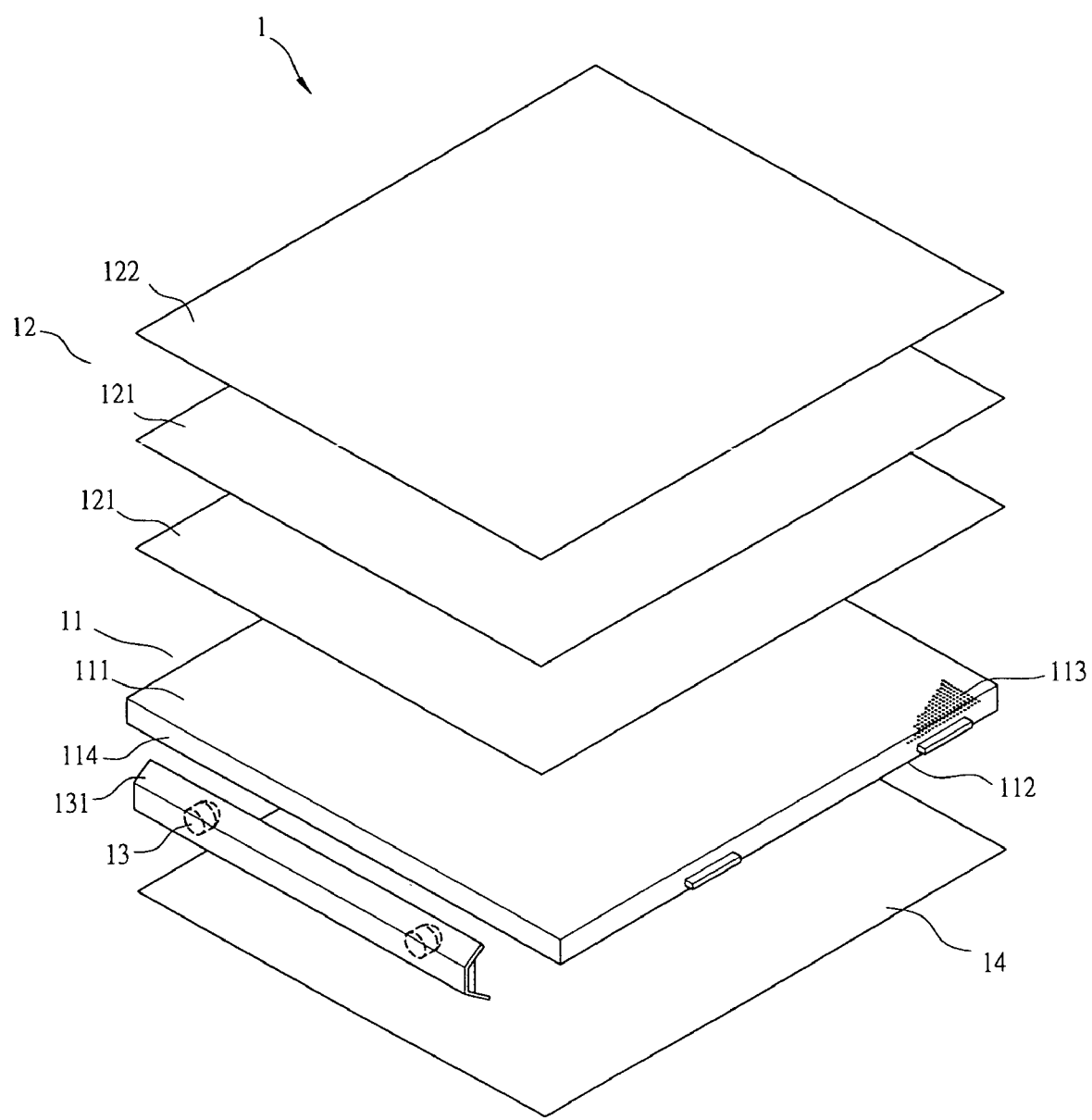
FIG. 1 is a perspective exploded view of a conventional rear light module.
Figure 2:
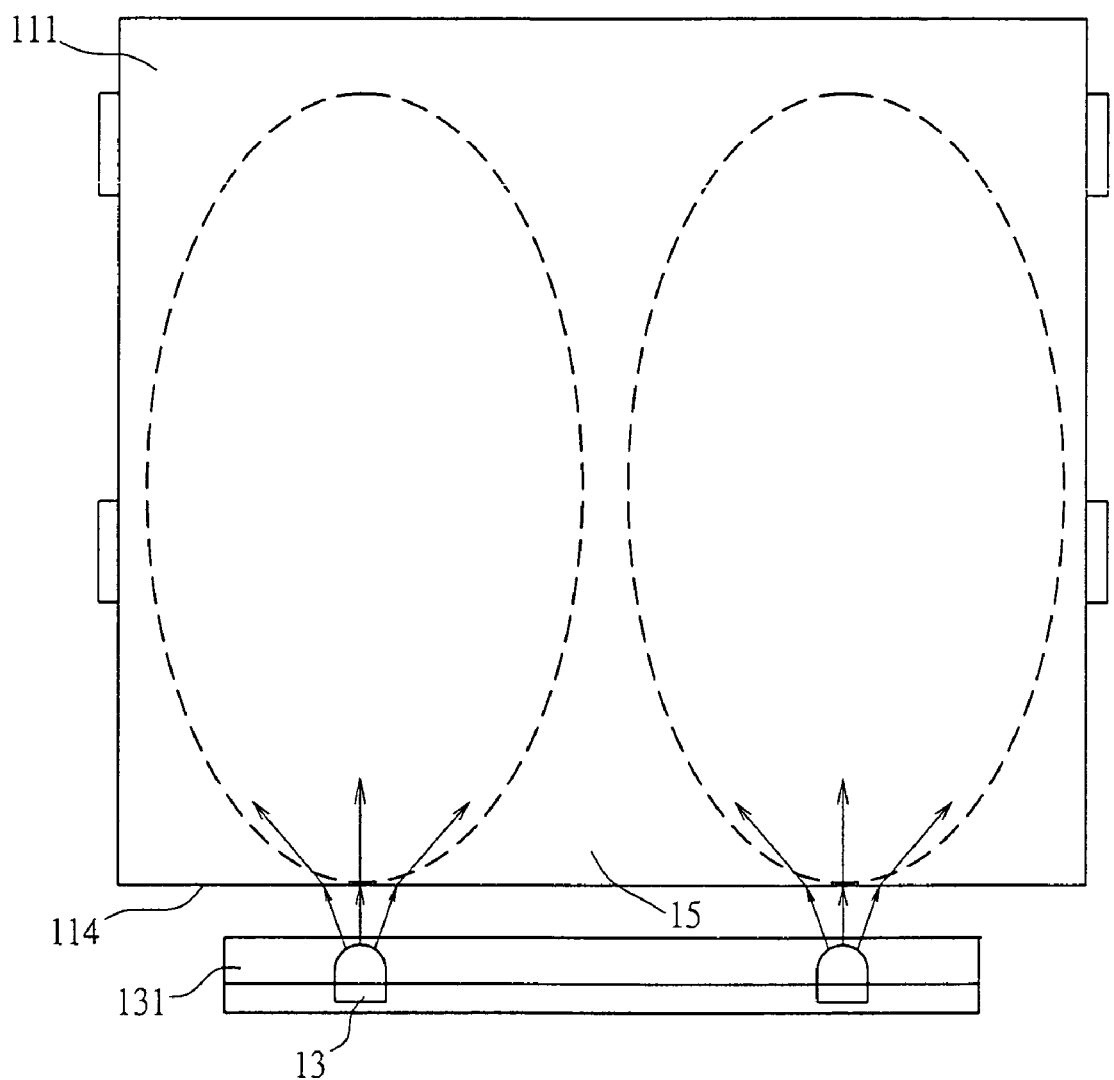
FIG. 2 is a schematic view showing the application of the conventional rear light module.
Figure 3:
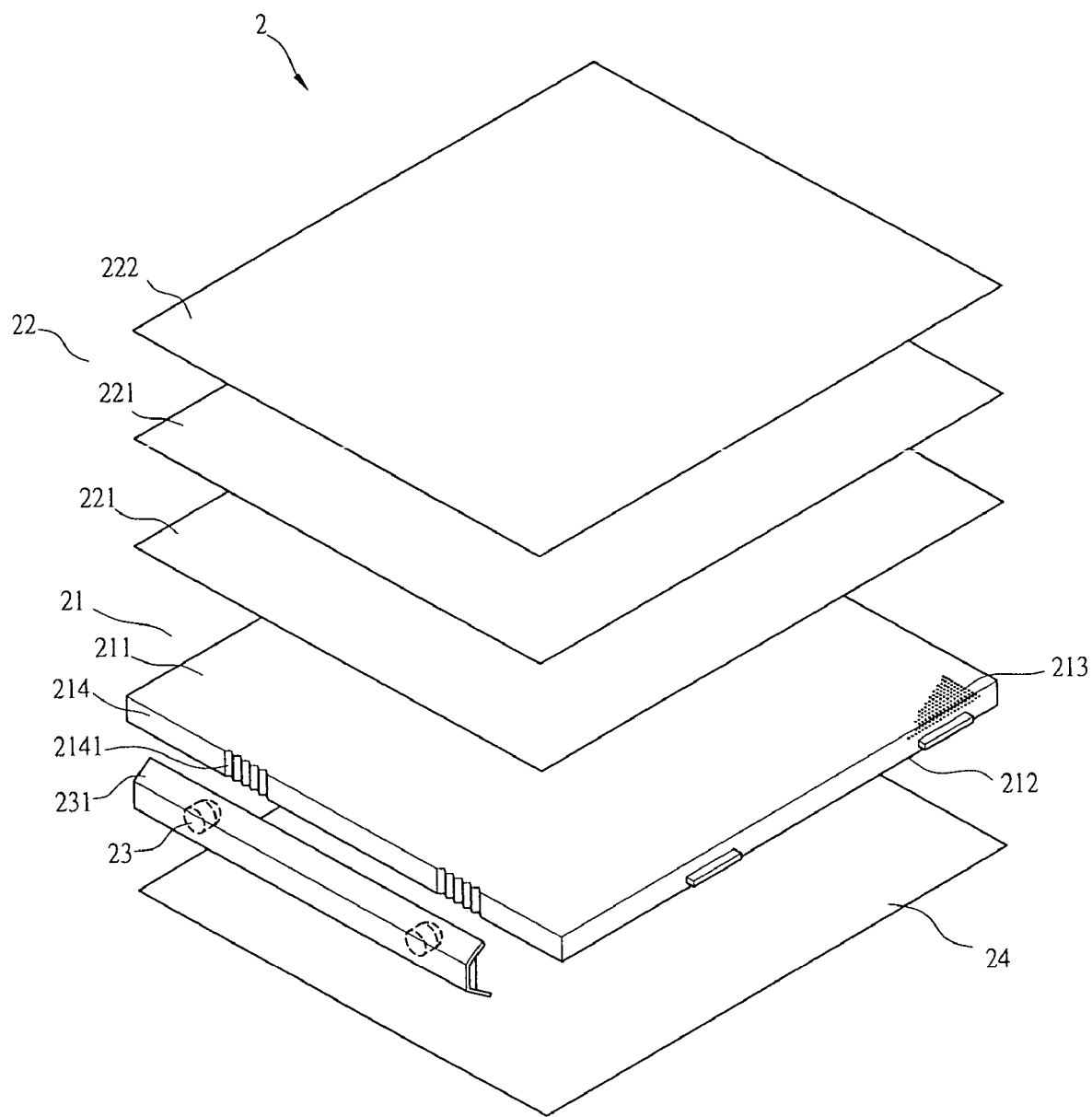
FIG. 3 is a perspective exploded view of another conventional rear light module.
Figure 4:
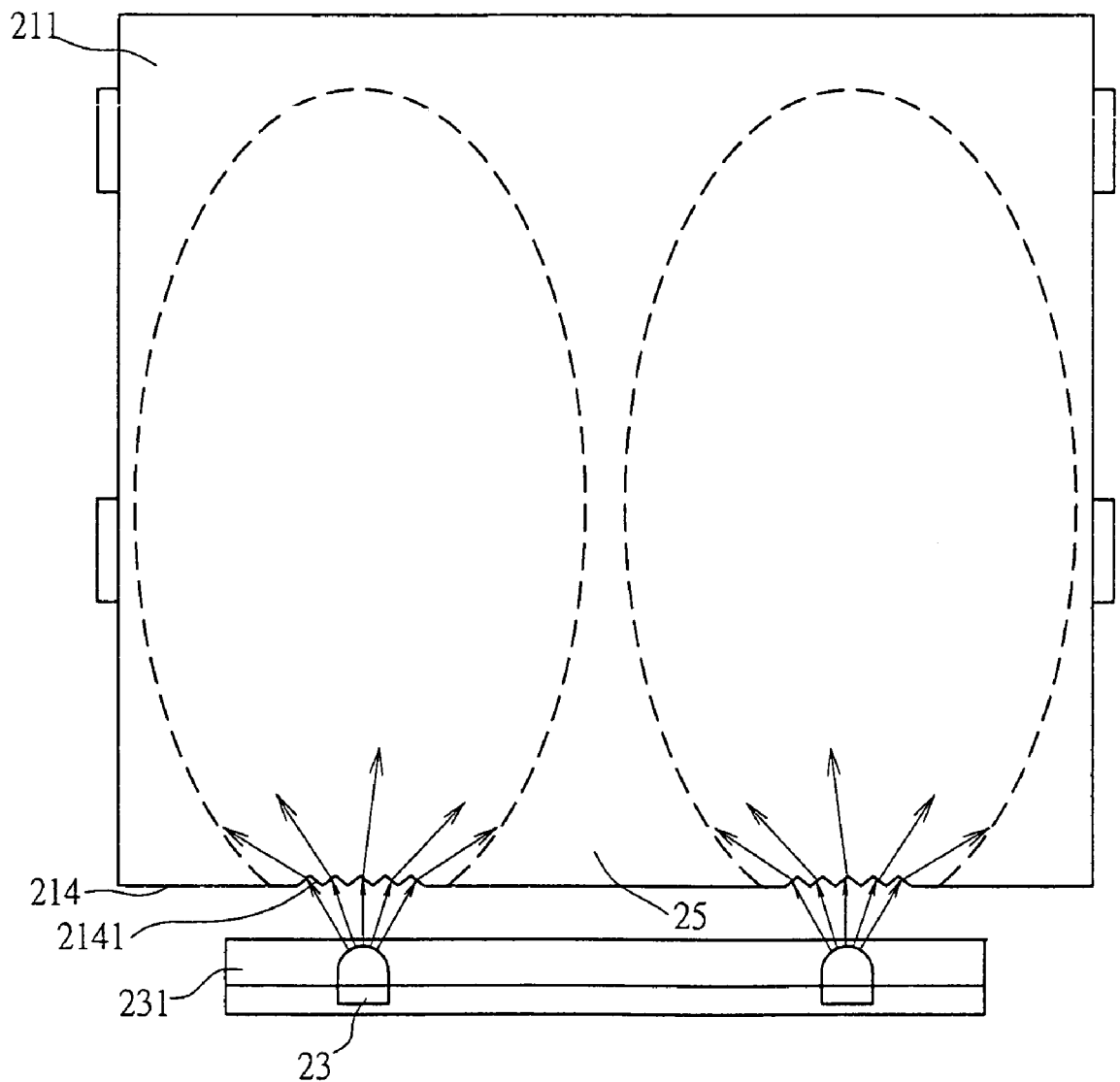
FIG. 4 is a schematic view showing the application of another conventional rear light module.
Figure 5:
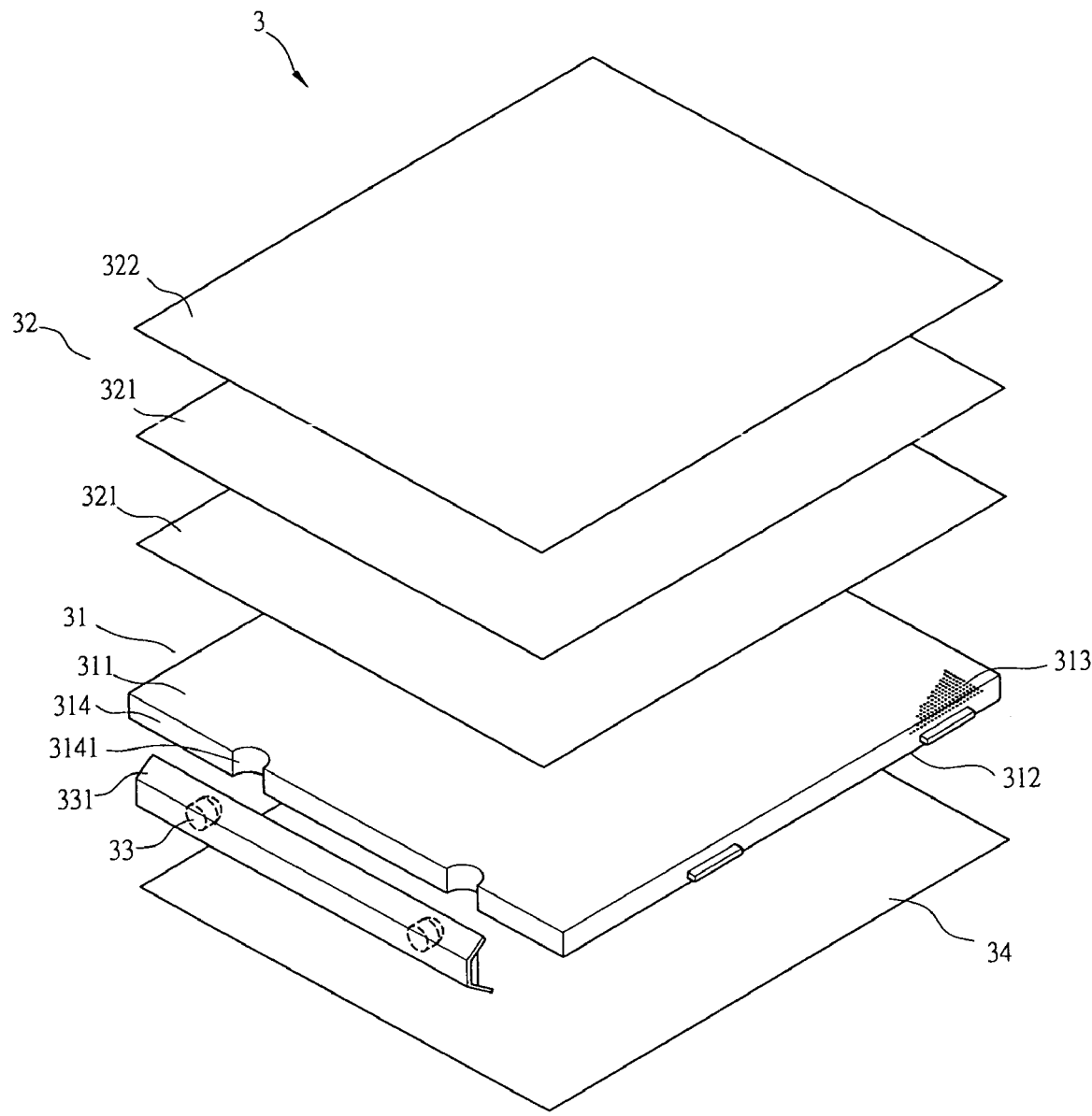
FIG. 5 is a perspective exploded view of another conventional rear light module.
Figure 6:
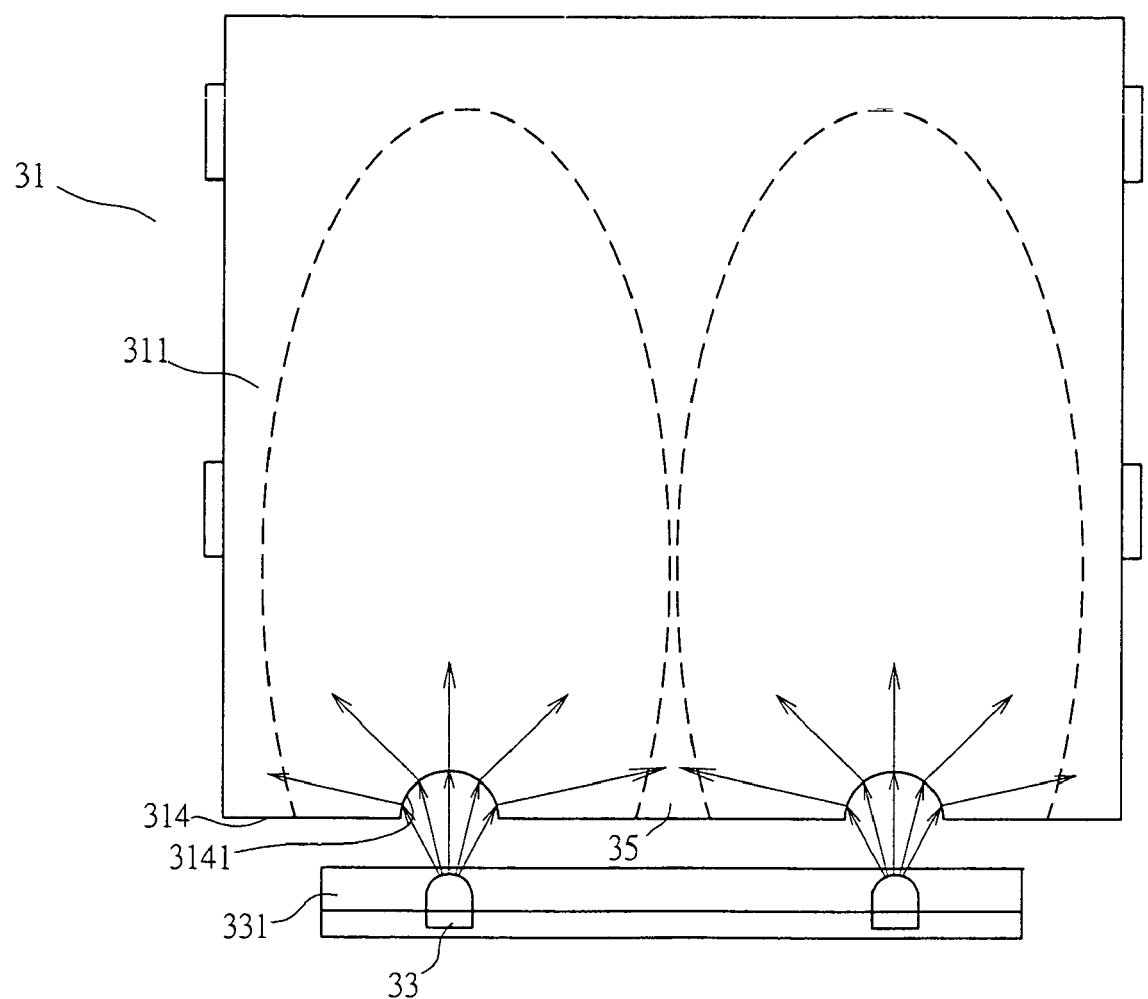
FIG. 6 is a schematic view showing the application of another conventional rear light module.
Figure 7:
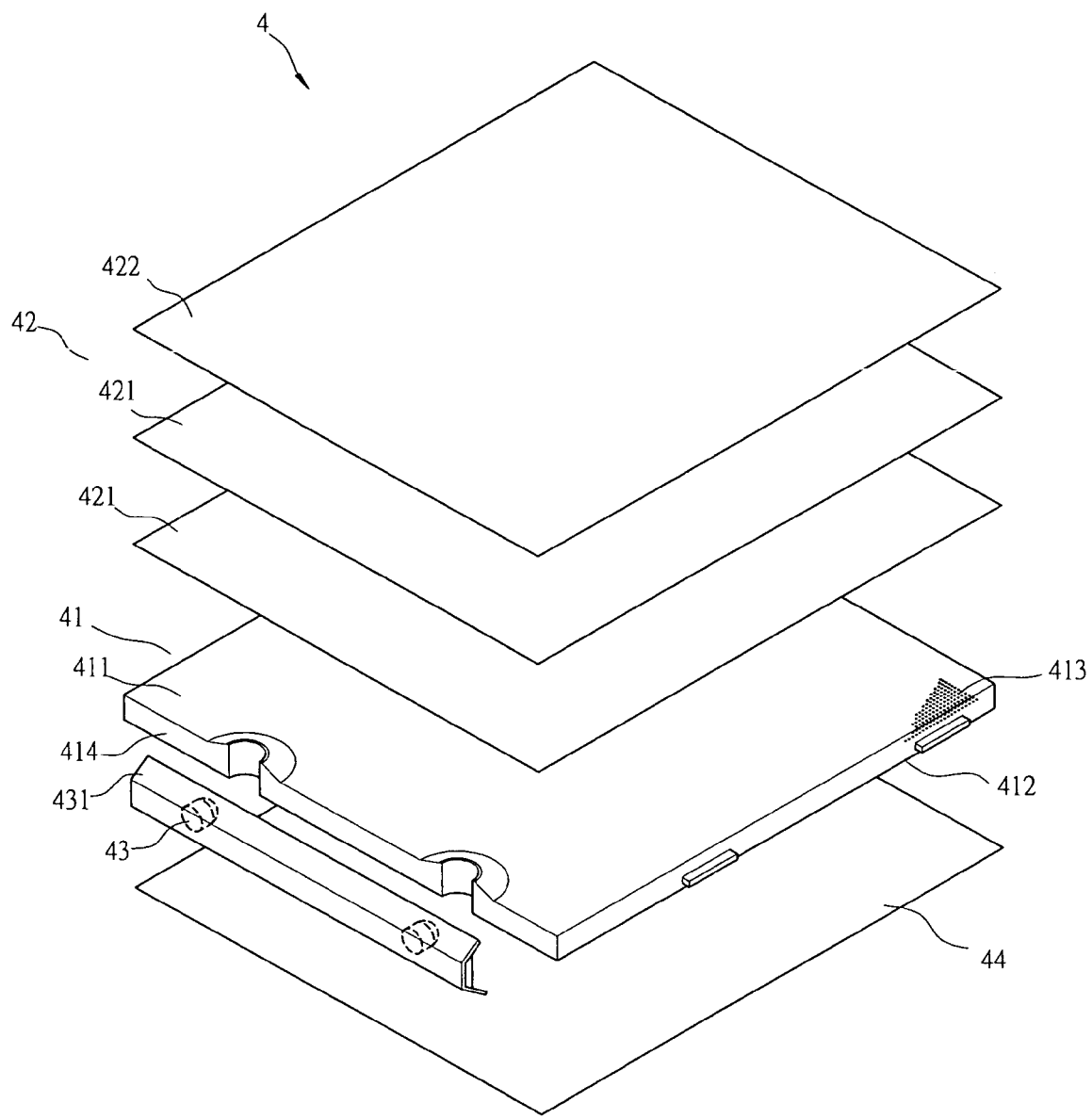
FIG. 7 is a perspective exploded view of the rear light module of the present invention.

Referring FIG. 7, there is shown a rear light module 4 including a light conductive board 41, an optical film 42, and a LED lamp source 43. The light-emitting face 411 of the light-conductive board 41 is mounted with the optical film 42 having one or more than one divergence lens 421 and a convergence lens 422. The reflective face 412 of the light conductive board 41 is provided with a plurality of light-conductive points 413, and a reflective board 44 is adhered at the external thereof, and at the same time, one side of the light conductive board 41 is provided with a light-entering face 414. The external side of the light-conductive board 41 is mounted with an LED lamp source 43. The LED lamp source 43 is enclosed by a lamp reflector 431.

Figure 8:
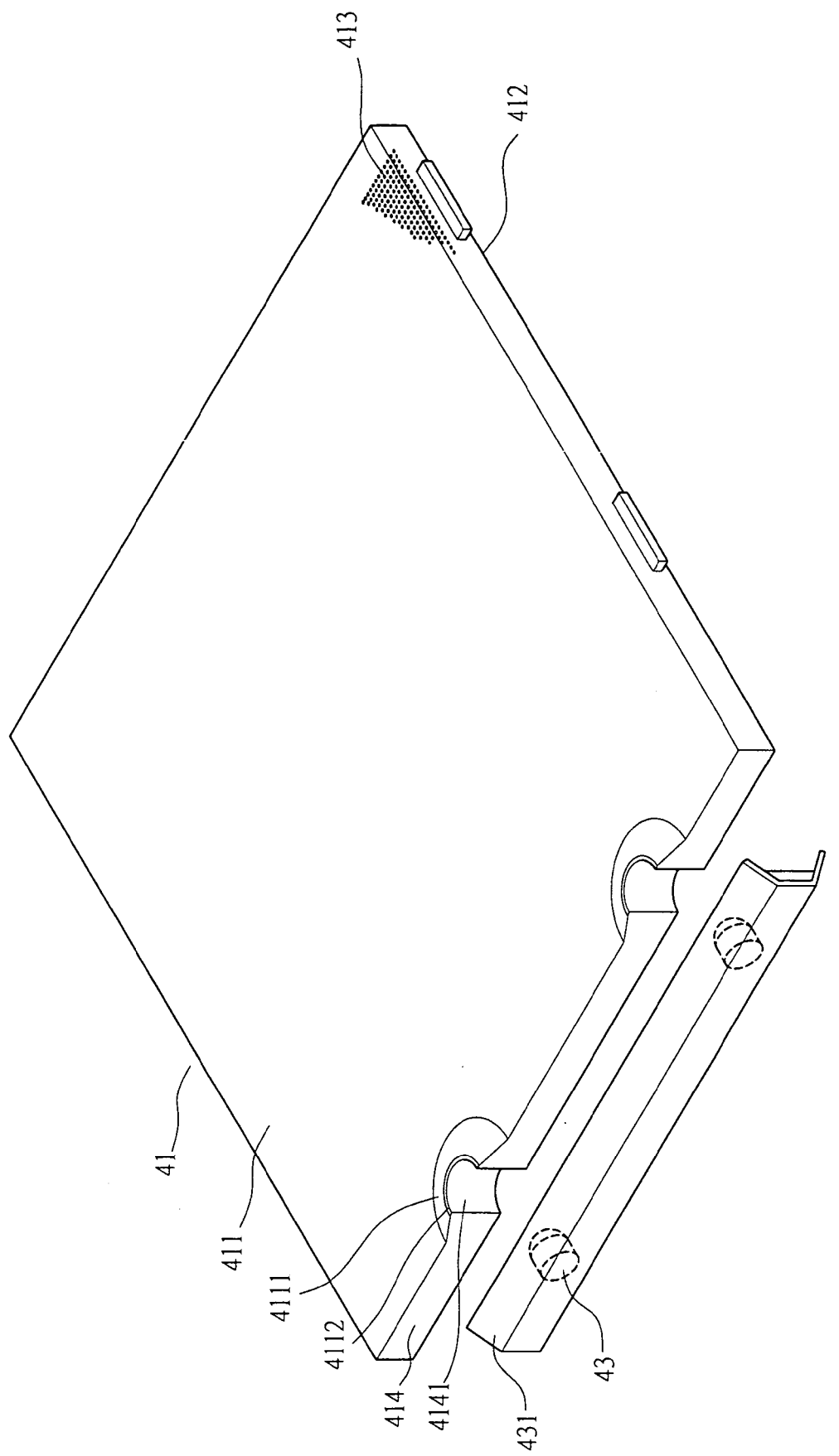
FIG. 8 is a partial perspective view of the rear light module of the present invention.

Referring to FIG 8, the light-entering face 414 corresponding to the LED lamp source 43, two light entering recessed sections 4141 which have a recessed arch face, and the light emitting face 411 is provided with a protruded section 4111. A flat section 4112 is formed at the top of the protruded section 4111 and located at an intersection between the light-emitting recessed section 4141 and the protruded section 4111.

Figure 9:
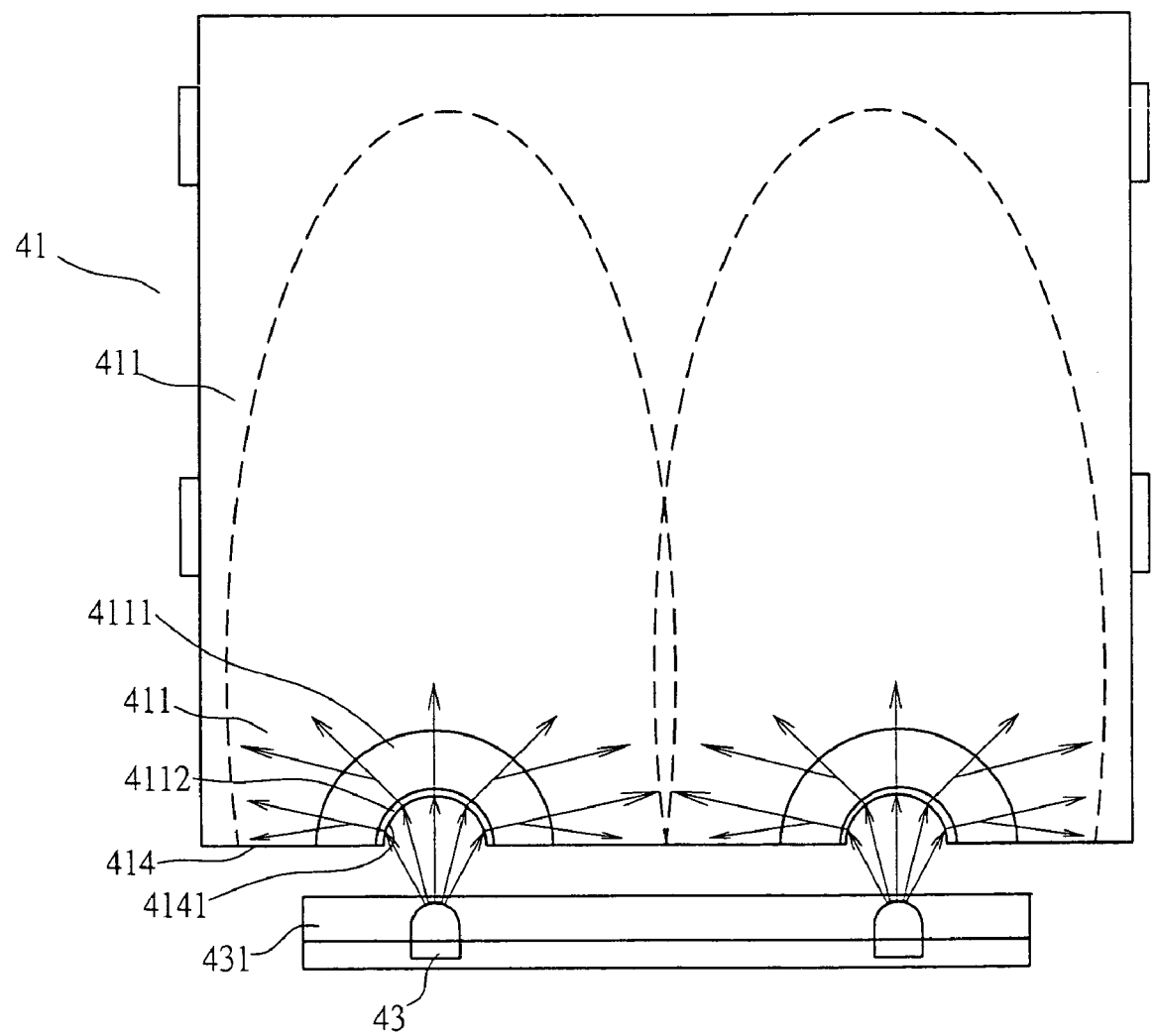
FIG. 9 is a simple schematic view of the application of the rear light module of the present invention.

As shown in FIG 9, when the LED lamp source 43 is turn on, the light of the LED lamp source 43 is reflected to the light recessed section 4141 by the lamp reflector 431. When the light enters the light-emitting recessed section 4141, the light of the lamp source 43 is widely refracted, and die protruded section 4111 allows the light source to be further refracted so as to avoid the loss of the light and the refracted angle of the light source is widened. The light conductive point 413 at the bottom section of the light conductive board 41 is a "net-point" distribution so as to prevent interference. Thus, the LED lamp source 43 generates evenly distributed light on the rear light module.

Figure 10:
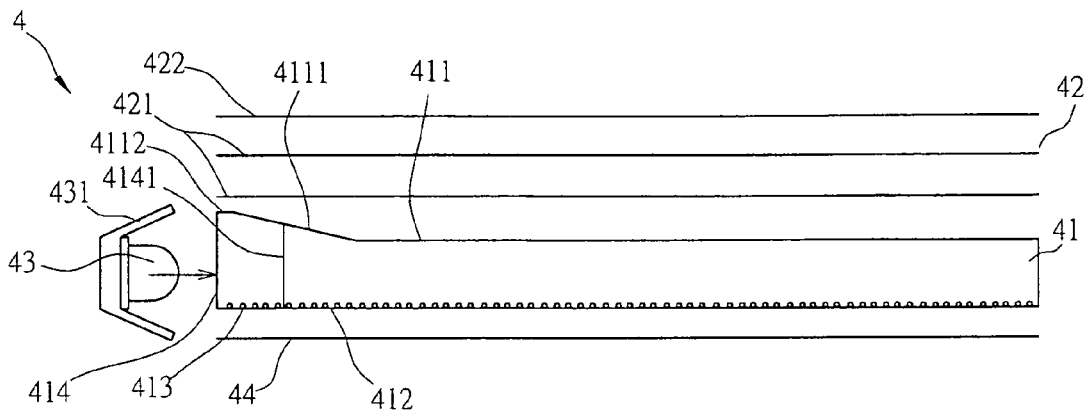
FIG. 10 is a simple schematic view of the rear light module of the present invention.

As shown in FIG 10, a flat section 4112 is formed at the top of the protruded section 4111 for preventing the protruded section 4111 from being damaged by inadvertent impact in assembly.

Figure 11:
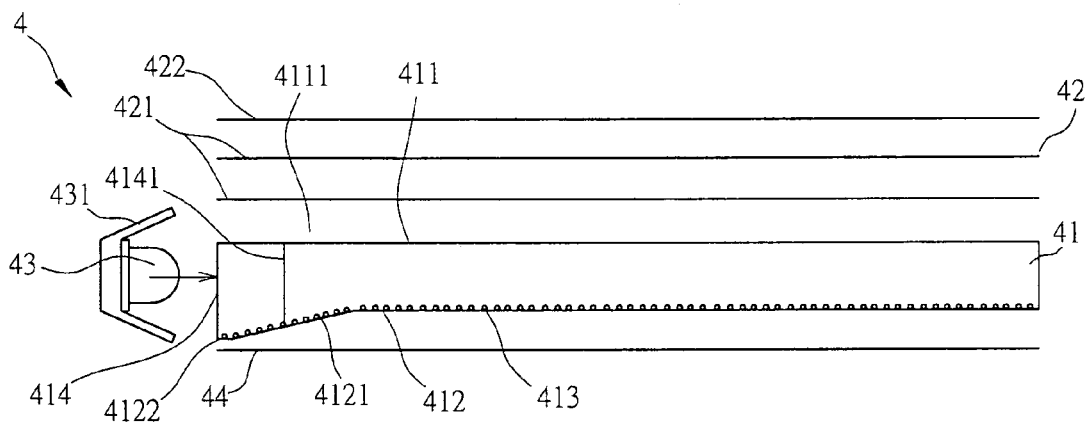
FIG. 11 is a simple schematic view of a preferred embodiment of the rear light module in accordance with the present invention.

As shown in FIG 11, a protruded section 4121 is formed on the reflective face 412 of the light conductive board 41 and positioned at the circumferential edge of the light-entering recessed Image Page 3 section 4141. A flat section 4122 is formed at the intersection between the protruded section 4121 and the light-entering recessed section 4141. Hence, the light from the LED lamp source 43 will be widely refracted by the light-emitting recessed section 4141 and then further refracted by the protruded section 4121.

Figure 12:
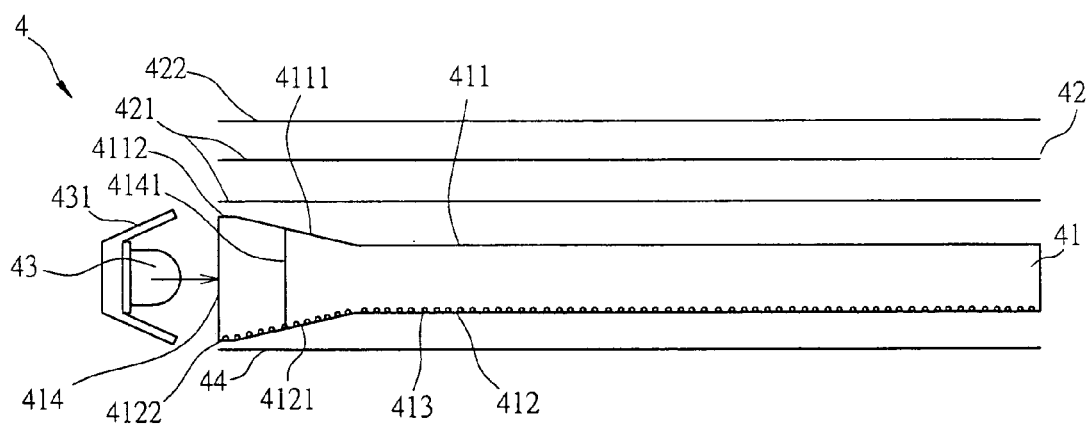
FIG. 12 is a simple schematic view of another preferred embodiment of the rear light module in accordance with the present invention.

Referring to FIG. 12, protruded sections 4111, 4121 are provided adjacent to the light-emitting face 411 and the light entering section 414. Thus, the reflective angle of the light source of the LED lamp source 43 can be further refracted. This will avoid the loss of light source and the emitting angle of the light source can be wider.

While the invention has been described with respect to preferred embodiments, it will be clear to those skilled in the art that modifications and improvements may be made to the invention without departing from the spirit and scope of the invention. Therefore, the invention is not to be limited by the specific illustrative embodiment, but only by the scope of the appended claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A rear light module comprising:
    a light conductive board having a light-emitting face, a reflective face and a light entering face, said reflective face being provided with a plurality of light-conductive points, said light entering face having at least one light entering recessed section having a recessed arch face, said light-emitting face being provided with a protruded section, a flat section being formed at an intersection between said light-entering recessed section and said protruded section;
    a reflective board mounted under said light conductive board;
    an optical film having at least one divergence lens and a convergence lens;
    an LED lamp source mounted close to an external side of said light conductive board; and
    a lamp reflector enclosing said LED lamp source.

* * * * *